Jan. 17, 1933.  C. WOOLSEY  1,894,364
HAND FERTILIZER DISTRIBUTOR
Filed Sept. 30, 1930   2 Sheets-Sheet 1

Inventor
CLAUDE WOOLSEY
By
Attorney

Jan. 17, 1933.  C. WOOLSEY  1,894,364
HAND FERTILIZER DISTRIBUTOR
Filed Sept. 30, 1930   2 Sheets-Sheet 2

Inventor
CLAUDE WOOLSEY
By
Attorney

Patented Jan. 17, 1933

1,894,364

UNITED STATES PATENT OFFICE

CLAUDE WOOLSEY, OF WASHINGTON, DISTRICT OF COLUMBIA, ASSIGNOR TO AMERICAN CYANAMID COMPANY, OF NEW YORK, N. Y., A CORPORATION OF MAINE

HAND FERTILIZER DISTRIBUTOR

Application filed September 30, 1930. Serial No. 485,574.

My present invention relates to a distributor for granular or powdered material, of which fertilizer is a type.

The principal object of the invention is the provision of a device of the type described which will be readily portable to handle compartively small portions of material, and which will be of a size that an operator may fill with material to be scattered or distributed, without himself coming in contact with such material, and swung from side to side to discharge the material therein over a comparatively wide area.

In one form of the invention, a hopper is provided to receive the material to be distributed, the hopper having a discharge opening and a valve closing this opening. A handle is secured to the hopper, which is adapted to be grasped by the operator, and the valve is provided with an operating lever extending backward to a point in proximity to the hopper handle, whereby the operator in grasping the handle and in swinging the whole device from side to side may readily manipulate the valve operating lever to close or open the valve as desired. Such a construction permits the operator to readily control the flow of material from the distributor to any portion of a swing. Additional means are provided at the discharge opening to facilitate the scattering of the material discharged from the hopper.

The invention further consists in the novel arrangement, combination and construction of parts more fully hereinafter described and shown in the accompanying drawings.

In the drawings—

Figure 1:
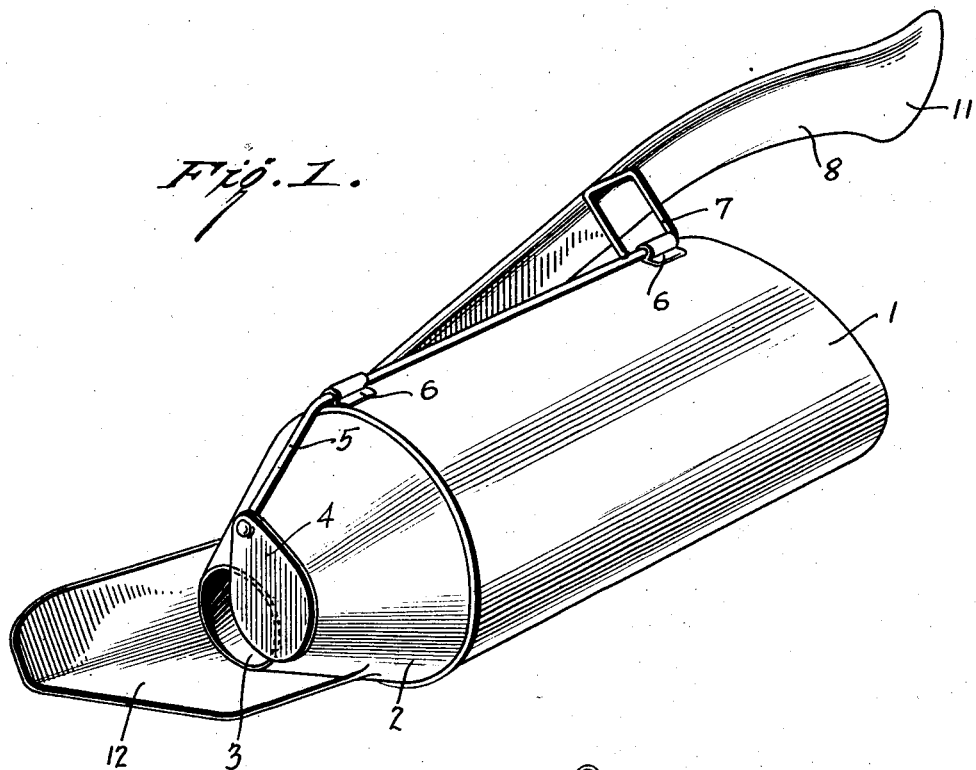
Fig. 1 is a perspective view of one embodiment of the invention.
Figure 2:
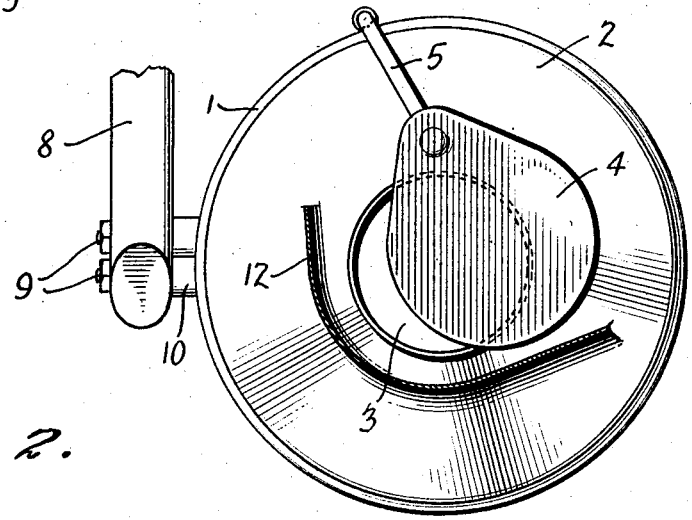
Fig. 2 is an end view of the device of Fig. 1.
Figure 3:
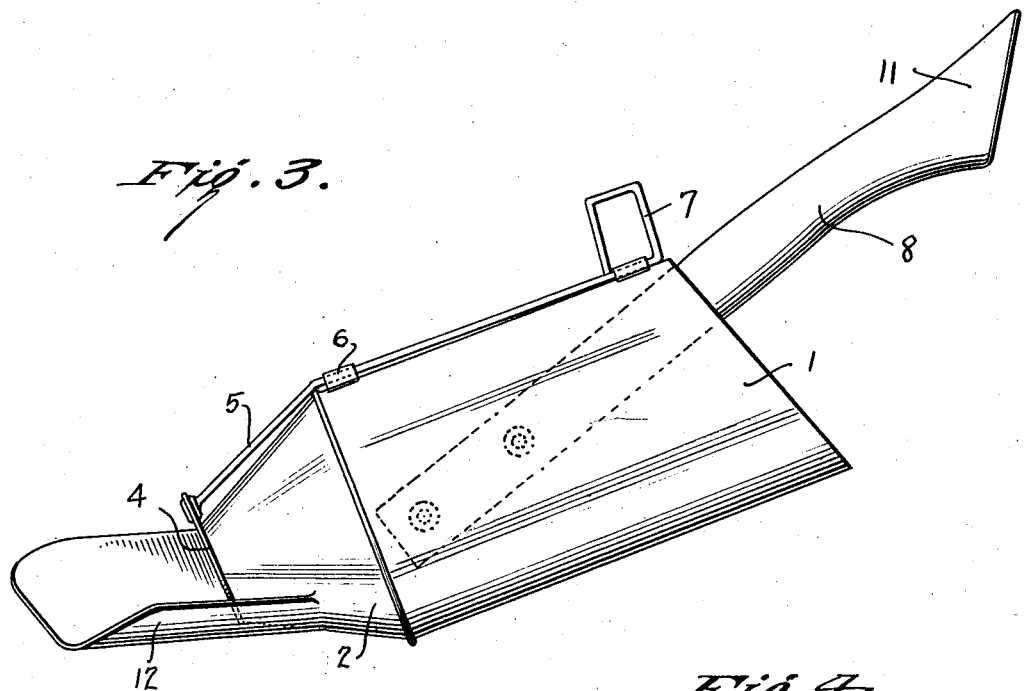
Fig. 3 is a side elevation of the device.
Figure 4:
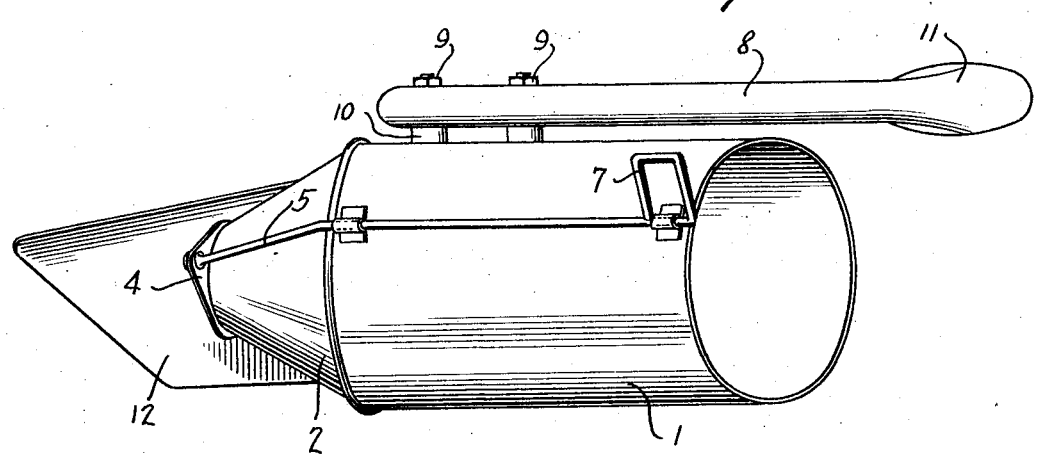
Fig. 4 is a top plan view of the distributor.

Referring now with particularity to the embodiment illustrated, I have shown a hopper to consist of a substantially cylindrical body 1 having attached at one end thereof a tapered or frustro conical portion 2 provided with a discharge opening 3. Obviously, the hopper may assume any desired form and size, which will be determined by the amount and character of material to be distributed. In this form, I prefer to leave one end of the cylindrical body 1 open in order that it may be readily filled with material from a suitable supply.

In the form illustrated, I have shown a cutoff valve 4 adapted to completely or partially close the discharge opening 3, and this valve 4 may conveniently consist of a flat metal plate secured at the end of an operating lever 5 secured to the cylindrical body 1 of the hopper as by means of clips or bearings 6. The opposite end of the operating lever is formed into a loop as at 7 for manipulation, as more fully hereinafter described.

The device is provided with a handle 8 axially offset from the hopper 1 and secured thereto as by bolts 9, studs 10 being located between the handle 8 and the hopper 1. As there may be considerable weight to the device when filled with material and considerable centrifugal force developed in swinging the same from side to side, I prefer to provide an enlargement 11 on the end of the handle 8 to facilitate holding the same by the operator and preclude the possibility of the entire device slipping out of his hand. As shown, the end 7 of the operating lever for the valve 4 extends to a point in proximity to the handle 8 so that the operator may manipulate the valve with the same hand which grasps the handle and without loosening his grip on the latter.

In some instances it will be found desirable to provide a scattering device such as the angular trough-like element 12 partially surrounding the discharge opening 3. This device, when the distributor is swung, for instance from right to left, receives the material flowing out of the discharge opening 3 and assists in scattering the same over a wider area than would be possible were this instrumentality not provided.

It will be apparent that any character of material may be distributed from the device, it being only necessary that such material shall have flowing properties and that the cutoff valve shall make a tight fit with the discharge opening to prevent loss of material. Obviously the valve 4 may be manipulated to give any desired size of opening and thus the amount of material discharged is absolutely within the operator's control at all times.

While the invention has been shown and described with particular reference to a specific embodiment, yet obviously I do not wish to be limited thereto but the invention is to be construed broadly and limited only by the scope of the claims.

I claim:

1. A distributor for flowable material, comprising a substantially cylindrical hopper having a tapered bottom portion, a discharge opening therein, a valve operable to close the opening, an operating lever for the valve extending along the hopper, a handle for the hopper secured to one longitudinal side thereof and extending generally longitudinally alongside of the hopper, the valve lever extending to a point in proximity to the handle, whereby the lever may be manipulated by an operator grasping the handle without releasing the handle.

2. A distributor for flowable material, comprising a substantially cylindrical hopper having a tapered bottom portion, a discharge opening therein, a valve operable to close the opening, an operating lever for the valve extending along the hopper, a handle for the hopper secured to one longitudinal side thereof and extending generally longitudinally alongside of the hopper, the valve lever extending to a point in proximity to the handle, whereby the lever may be manipulated by an operator grasping the handle without releasing the handle, and a scattering device at the discharge opening.

In testimony whereof, I have hereunto subscribed my name this 27th day of Sept., 1930.

CLAUDE WOOLSEY.